United States Patent [19]

Holm

[11] Patent Number: 4,860,840

[45] Date of Patent: Aug. 29, 1989

[54] ARRANGEMENT IN A LOAD-SENSING BODY

[75] Inventor: Lauri Holm, Lidingö, Sweden

[73] Assignee: Systemteknik AB, Lidingo, Sweden

[21] Appl. No.: 198,214

[22] Filed: May 25, 1988

[51] Int. Cl.$^4$ .................... G01G 5/04; G01G 21/10
[52] U.S. Cl. .................................. 177/208; 177/189
[58] Field of Search ............ 177/208, 209, 254, 189; 73/862.58

[56] References Cited

U.S. PATENT DOCUMENTS

| | | | |
|---|---|---|---|
| 1,479,581 | 1/1924 | Berry | 177/208 X |
| 3,005,337 | 10/1961 | Waziri | 73/862.58 |
| 4,055,227 | 10/1977 | Brackett | 177/208 |
| 4,184,555 | 1/1980 | Maltby et al. | 177/189 X |

Primary Examiner—George H. Miller, Jr.

Attorney, Agent, or Firm—Shapiro and Shapiro

[57] ABSTRACT

A load-sensing body for weighing machines and the like, comprising two circular plates (1, 2) and an intermediate space (15) communicating with a pressure-sensing member, an O ring-type seal being arranged between the plate circumferences, and one plate being provided with at least two open grooves (11, 12) in the opposing plate sides, the grooves being arranged at a slight radial distance from one another and facilitating axial displacement of a central plate portion disposed inside the grooves upon axial compression of the plates.

Elastically yieldable portion are arranged in the load-sensing body to act between the body and loading and-/or load-receiving elements for the purpose of allowing initial compression of the plates to prevent for an initial compression of the seal and subsequently allow direct load transmission to the load-sensing body.

7 Claims, 1 Drawing Sheet

ARRANGEMENT IN A LOAD-SENSING BODY

The present invention relates to an arrangement of the type as stated in the preamble of the main claim.

A known problem in arrangement of this type is that, at a given load, the O ring sealing between the parts is compressed and yields (without giving up its sealing function), which means that the resulting signal supplied by the pressure transducer deviates from the actual value.

A further problem is that, owing to the opposed stresses, the material adjacent the grooves milled from opposite directions is subjected to progressive fatigue causing a change in the characteristics even before fracture occurs.

The object of the invention is to provide an arrangement in which the above-mentioned drawbacks are eliminated and which has a uniform resistance curve over the entire measuring range.

The features characterizing the invention are defined in the appended claims.

Figure 1:
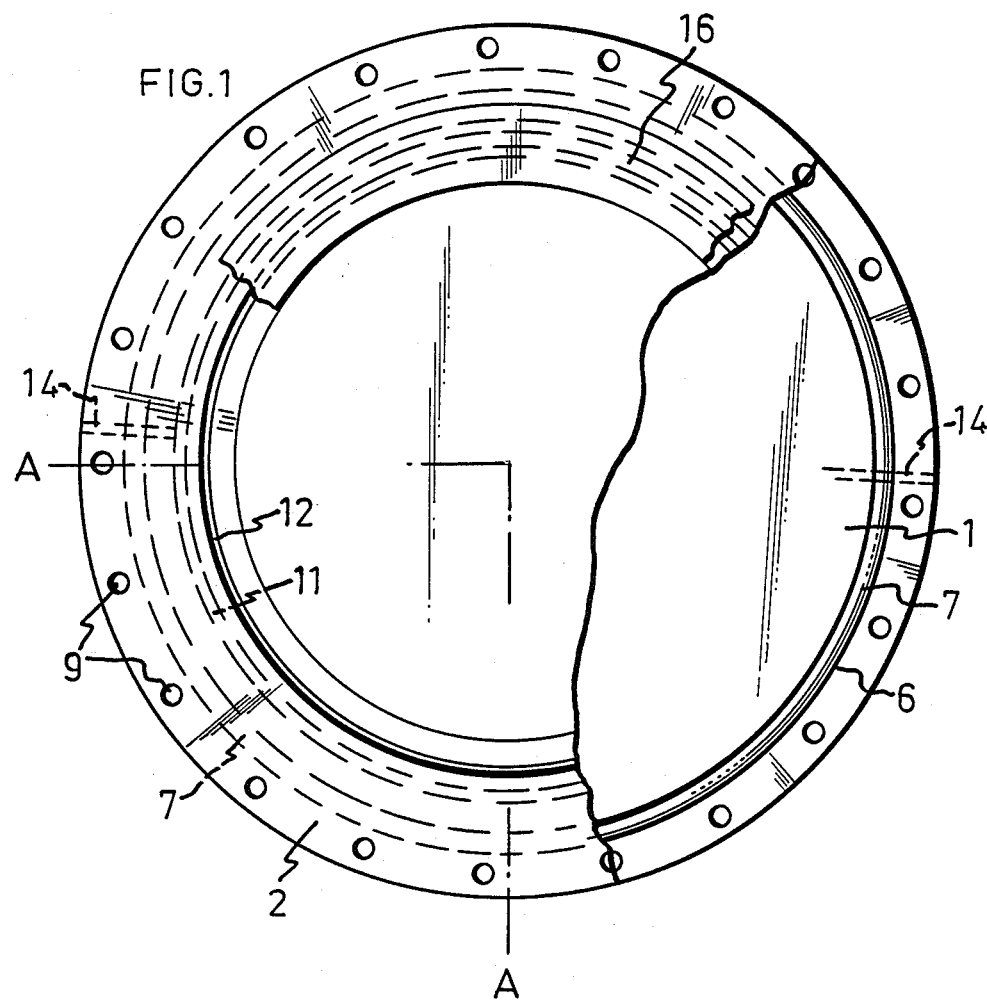
Figure 2:
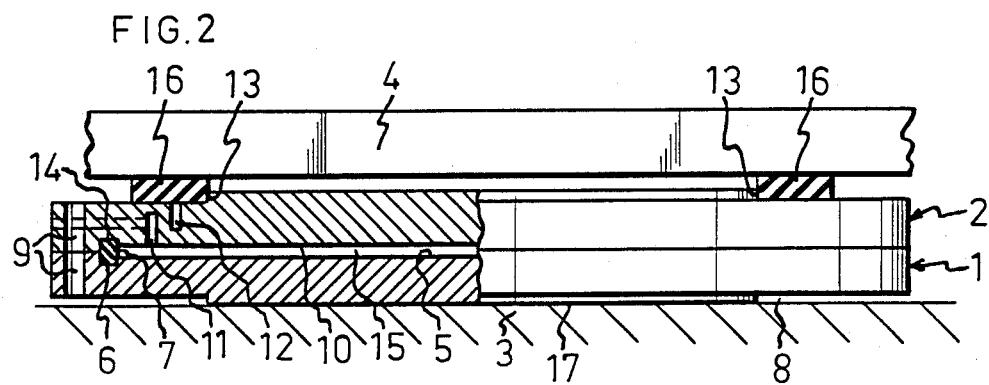

One embodiment of the arrangement according to the invention will be described in greater detail below, reference being had to the accompanying drawing in which FIG. 1 is a plan view, partly in cross-section, of the arrangement, and FIG. 2 is a cross-sectional view along line A—A in FIG. 1.

The arrangement according to the invention is mainly intended for weighing machines and similar apparatus. One or, usually, two or more load-sensing bodies are mounted in the weighing machine in such manner that a load placed on the weighing platform or the like directly acts on the bodies. The bodies are connected with recording instruments indicating the weight of the load.

A load-sensing body according to the invention comprises a first and a second circular plate 1 and 2 positioned between a stationary base 3 and a weighing platform 4 or the like.

One plate, usually the lower one, has a planar upper side 5 which comprises a circumferential groove 6 for an O ring, and a lower side which preferably has a central portion 17 projecting slightly beyond an outside portion 8. Along the circumference of the plate, outside the O ring groove 6, there are formed a plurality of holes 9 for bolts.

The other plate, in the embodiment illustrated the upper one 2, is also provided with a series of holes 9 for bolts along its circumference and, inside said holes, preferably has a groove 6 for said O ring 7.

The downwardly facing side 10 of the plate 2 comprises, inside said O ring groove, one (as in the embodiment shown), or a pair of radially narrow but deep grooves 11. Adjacent this groove, there extends a similar groove 12 from the opposite side of the plate. The lower side of the plate 2 is planar, but the upper side comprises a countersunk outer portion and a raised central portion. A step 13, between the outer portion where the plate is thinner, and the thicker inner portion of the upper side of the plate, is positioned slightly inside the inner one of the narrow deep grooves 11.

Ducts 14 extend from the axial edge surface of the plate and open in the area inside the O ring groove 6.

Between the two plates 1 and 2, in the area inside the O ring seal, there is formed a space 15 filled with a fluid and communicating, via the ducts 14, with a pressure transducer (not shown).

On the upper plate 2, there is arranged around the raised inner portion an annular disc 16 of elastomeric material, such as rubber or the like, which has a thickness exceeding the height of the step 13. The weighing platform 4 or like load-transmitting and loaddistributing means rests in is nonactivated state against the annular disc 16. As shown in the drawing, the annular disc 16 is mounted so as to substantially cover the area where the grooves 11 and 12 are positioned, which area forms a "bellows" allowing the central portion of the upper plate to move.

The load-sensing body functions such that, when a load is applied to the upper plate, the central portion thereof is pressed down and pressurizes the fluid in the space 15. The fluid pressure is sensed by the presssure transducer which, in turn, is connected to an electronics unit (not shown) for displaying or recording the weight of the load.

Since the space 15 is radially outwardly defined by an elastic wall, i.e. the O ring 7, a linear increase of a load acting directly on the upper plate 2 would not cause a linear increase of the fluid pressure, since the yieldability of the O ring causes a gradual change in the volume of the space 15. More particularly, when the load and, consequently, the fluid pressure are moderate, the material of the O ring is non-compressible. However, the O ring when the fluid pressure reaches a certain level, this makes it difficult to compensate for errors by external means.

By initially transmitting the load via an elastic yieldable portion, i.e. the annular disc 16, as suggested according to the present invention, it is possible to obtain a practically linear pressure increase over the entire measuring range. Simultaneously, the stress is distributed over the entire area comprising the grooves 11 and 12, whereby the risk of fatigue breakdown in the portions adjacent and between the grooves 11 and 12, which are subjected to bending, is reduced considerably.

When a load is applied to the weighing platform 4, the entire stress will, in the embodiment shown, initially act through the annular disc 16 which, at the same time as it is compressed, expands radially. To prevent interference by hysteresis, the surfaces facing the disc must be carefully polished. The material of the annular disc 16 is chosen so that the disc is compressed to such an extent that the weighing platform 4 acts directly on the central portion of the upper plate 2 only when the fluid pressure begins to compress the O ring 7. The distribution of the load between the central portion, the bellows portion and the outside portion of the plate 2 obtained by means of the annular disc, is thus adapted to the determinable yieldability of the O ring in such manner that, when the annular disc is rendered inactive, the bellows portion takes over.

In a modified embodiment for specific applications, the elastic yieldability can be obtained by providing both the upper and the lower plate with radially spaced-apart grooves on both sides, such that a bellows-like portion is formed around the central portion of each plate. By designing and locating the grooves with regard to the elasticity properties of the plate material and the material characteristics of the O ring radially defining the fluid space between the plates, elastic yieldability between the central portions of the plates up to a certain limit can be provided such that substantially the same effect as in the embodiment described above can be obtained.

On application of a load to the upper plate, its bellows portion and also the bellows portion of the lower plate engaging with a non-compressible support will be elastically deformed in a controlled manner to an extent corresponding to the deformation of the O ring caused by the increase in pressure. When this initial deformation has taken place, and the lower side of the lower plate rests against the support, the resulting pressure build-up indicates the weight of the applied load.

Experiments have shown that the compression of the O-ring can be similarly compensated for if an annular disc is arranged between the lower plate 1 and the base 3, but this does not give the favorable and progressive "bellows" effect which is provided by the grooves 11 and 12 and which makes for longer service life.

The invention can be modified in many ways within the scope of the appended claims.

I claim:

1. An arrangement in a load-sensing body for weighing machines and the like, comprising a first substantially circular plate circumferentially mounted to a second substantially circular plate such that opposing inner surfaces of said first and second plates define a space therebetween for containing a pressure-sensing fluid, an elastic deformable O-ring seal circumferentially sealing said space, and duct means communicating with said space for providing fluid communication between said space and a pressure transducer means, said first plate having bellows means including at least two radially spaced circumferentially extending grooves formed respectively in the inner surface and an outer surface of said first plate for allowing movement of a central portion of said first plate toward said second plate upon application of a load to the outer surface of said first plate, and characterized in that elastically yieldable means is arranged to act between the outer surface of one of said plates and a load supporting means opposite the outer surface of said one plate for elastically yielding upon loading of the outer surface of said first plate such that said central portion of said first plate moves toward said second plate to a lesser degree than it would if said load were applied to the outer surface of said first plate in the absence of said elastically yieldable means.

2. An arrangement as claimed in claim 1, characterized in that the outer surface of said one plate has a countersunk portion, said elastically yieldable means comprises elastomeric material disposed between said countersunk portion and said load supporting means and, when the outer surface of said first plate is not under load, said elastomeric material has a thickness sufficient to hold the outer surface of said one plate and said load supporting means spaced from one another.

3. An arrangement as claimed in claim 2, characterized in that said countersunk portion is arranged on said first plate, and the thickness of said elastomeric material compresses to a point where said load supporting means comes into contact with said central portion of said first plate when a load applied to said outer surface of said first plate through said load supporting means and said elastomeric material is sufficient that said pressure-sensing fluid begins to compress said O-ring seal.

4. An arrangement as claimed in claim 2, characterized in that surfaces of said load supporting means and said countersunk portion in contact with said elastomeric material are treated to reduce surface friction with said elastomeric and configured to allow free expansion of said material in at least one radial direction.

5. An arrangement as claimed in claim 2, characterized in that said countersunk portion is arranged around said central portion of said first plate, and said elastomeric material covers said grooves.

6. An arrangement as claimed in claim 5, characterized in that said load supporting means comprises a weighing platform, and said elastomeric material is in the form of an annular disc of sufficient thickness to support the weighing platform spaced above said first plate when the outer surface of said first plate is not loaded.

7. An arrangement as claimed in claim 6, characterized in that the thickness of said annular disc compresses to a point where said weighing platform comes into contact with said central portion of said first plate when a load applied to said outer surface of said first plate through said weighing platform and said annular disc is sufficient that said pressuresensing fluid begins to compress said O-ring seal.

* * * * *